March 27, 1951     C. C. MARTIN     2,546,464
AUTOMATIC DEEP FRYER
Filed Feb. 27, 1947     2 Sheets-Sheet 1
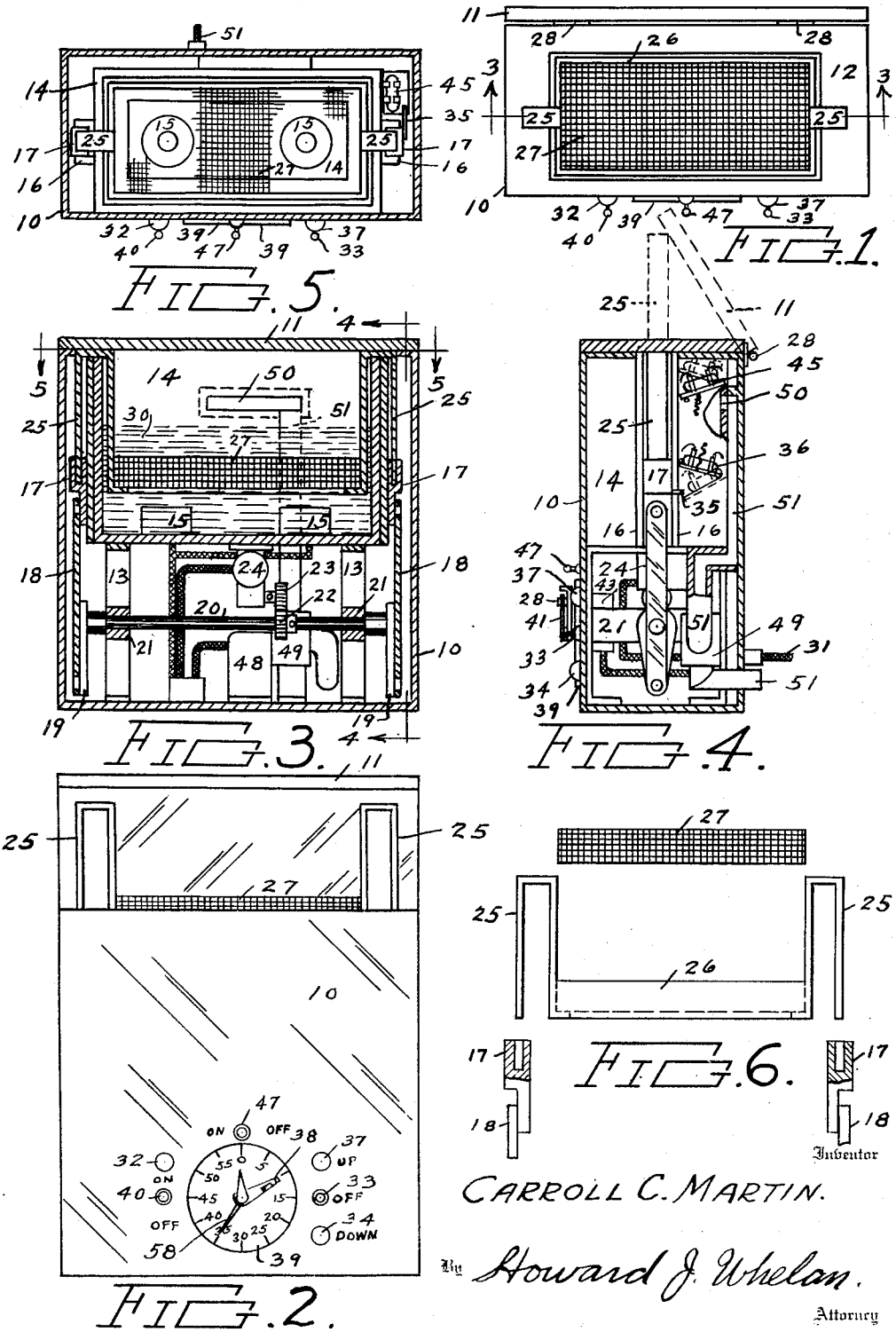
CARROLL C. MARTIN.
By Howard J. Whelan.
Attorney Inventor
CARROLL C. MARTIN.
By Howard J. Whelan.
Attorney Patented Mar. 27, 1951

2,546,464

UNITED STATES PATENT OFFICE 2,546,464

AUTOMATIC DEEP FRYER

Carroll C. Martin, Baltimore, Md.

Application February 27, 1947, Serial No. 731,306

2 Claims. (Cl. 99—404)

This invention relates to cooking equipment and more particularly to that intended for use in the cooking of articles of food in fat or grease for a limited time.

This invention has for an object the development of a cooking vessel that can cook in grease or fats selected articles of food, that will avoid one or more of the disadvantages and limitations of the prior art.

Another object of the invention is to provide a cooking vessel that will be able to automatically control the cooking of articles of food, and provide for a minimum amount of handling.

Another object of the invention is to provide a device to mechanically lower the article to be cooked into the cooking medium and at a predetermined time, raise the cooked article out of the cooking medium to prevent its being overcooked.

Another object of the invention is to provide means for heating the cooking medium and automatically control its temperature.

Another object is to provide means for exhausting fumes from the cooking compartment at predetermined intervals.

Another object is to provide means whereby the raising of the food cooking basket will automatically open the cover for the extraction or placement of the food in the basket.

Other objects will become apparent as the invention is more fully set forth.

For a better understanding of the invention reference is made to the appended drawings in which a particular form of the invention is shown, and the following description wherein the details are described to show their functions, operation and use in the particular form, which is used as an example to illustrate the principles of the invention, while the claims emphasize the scope of the invention.

Figure 8:
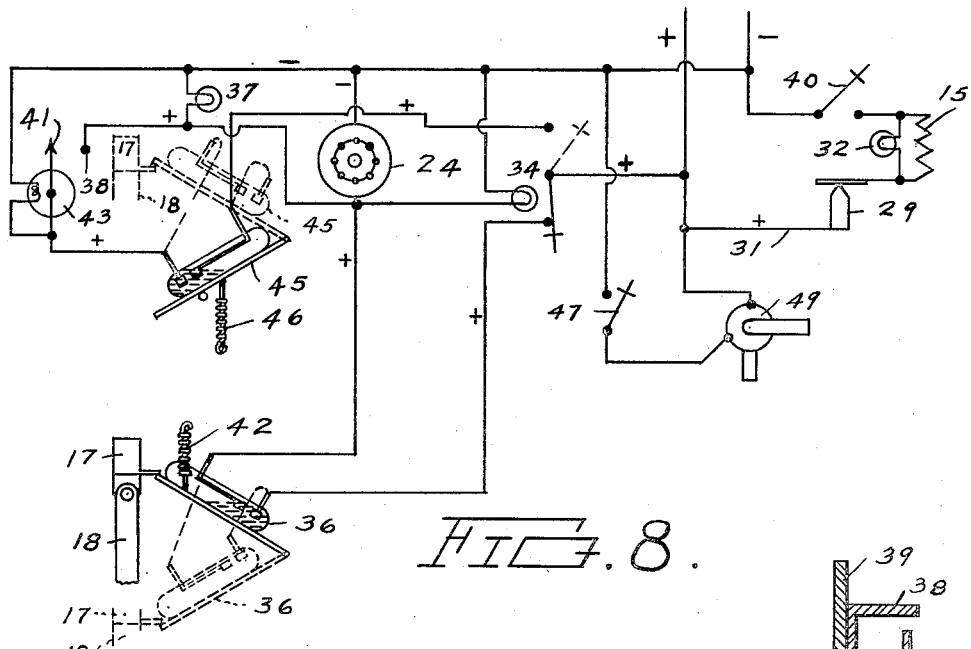
Figure 7:
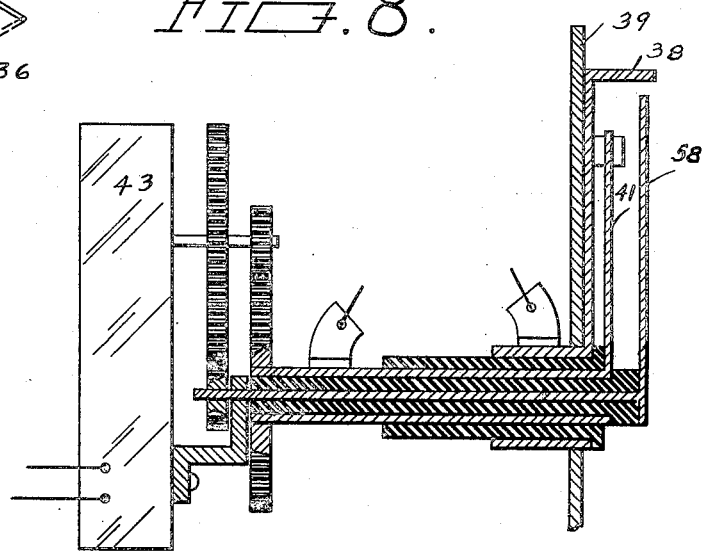

In the construction of the invention shown in the several views of the drawings:

Figure 1 is a plan view of the automatic cooker device embodying this invention, with the cover open, Figure 2 is a front elevation of Figure 1, with the basket in its upper position, Figure 3 is a front sectional elevation on line 3—3 of Figure 1, Figure 4 is a sectional view taken along line 4—4 of Figure 3, Figure 5 is a sectional view taken along line 5—5 of Figure 3, Figure 6 is a view of the cradle and basket separated from each other, Figure 7 is a sectional view through the clock timing mechanism, and Figure 8 is a wiring diagram used in the device.

Similar reference characters refer to similar parts throughout the drawings.

In the drawings, an outside housing 10 has a lid 11 hinged to its upper portion for covering the interior. It is preferably rectangular in form and completely closed-in on all sides except the top, where it is bent to form a plate 12 on which the lid 11 can rest flat. A pair of brackets 13 are secured to the bottom of the housing and extend vertically up inside the housing to support a rectangular grease tank 14. The grease tank 14 is open at the top and is mounted within the housing, and serves to hold the hot grease used for cooking the articles of food held within it. The grease is heated by electric elements 15 attached to the bottom of the tank 14 and spaced apart to present an effective heating surface to the grease surrounding them in the tank. A pair of rails 16 are attached to the outside surfaces of the end walls of the tank and serve as guides to sliders 17 adapted to ride within them. These sliders 17 are attached to connecting rods 18 which are operated by cranks 19 mounted on a shaft 20 within journals 21 provided on the brackets 13. A gear 22 is suitably located on the shaft 20 and rigidly connected thereto. A driving gear 23 mounted on the shaft of a motor 24 drives the gear 22 in which it is meshed. This motor 24 is attached to the tank 14 on the bottom wall, convenient to its operation. A pair of link mechanisms 25 are removably attached to the sliders 17 and are bent so as to extend over the edges of the tank walls and down the side of same inside the tank 14 and at a suitable depth and join a cradle 26 horizontally placed across the tank above the top of the heating elements 15 when in its lowest position. This cradle 26 forms a support for a rectangular wire basket 27 in which the articles of food to be cooked are placed. The operation of the shaft 20, with the cranks 19 and connecting rods 18 against the sliders 17 and mechanisms 25 raises and lowers the cradle 26 with the basket 27 and its contents. Normally the grease 30 is poured into the tank 14 until it is at a level below the inlet 50 or about two thirds of the height of the tank, and completely immersing the wire basket 27 when in the lower or cooking position. When the mechanisms 25 are operated on the upward stroke they raise the basket 27 so it is raised out of the grease 30 with its contents, and then drains the grease back into the tank and stops cooking the contents. When the mechanisms 25 operate, they also raise the lid 11 against the tension of typical spring hinges 28 that tend to keep it normally closed down on the housing. The raising of the lid 11 enables the contents to be reached and removed after the cooking and other articles are replaced in their stead.

In order to control the temperature of the grease a manually operated switch 40 is closed. A thermostatic switch 29 is installed on the wall of the tank 14 so as to switch the current on or off the conductors 31 as the occasion may require. At the same time a lamp 32 is lighted to indicate the fact that the current is on. The articles of food are placed in the basket. The hand 38 is positioned on the dial 39 to indicate the cooking time desired, and the rotating contact band 41 is set at zero, the second or sweep hand 58 shows when the clock mechanism is operating. The switch 33 is closed downwardly and lights lamp 34 to indicate the current is on and the basket and articles to be cooked are being lowered into the heated grease by the motor 24. As soon as the basket reaches its lowest point a projecting arm 35 attached to the slider 17, contacts the mercury switch 36 and opens the circuit and stops the motor 24. The mercury switch 36 is normally kept in closed circuit position by spring 42 which pulls up on same. At this point the switch 33 is thrown upwardly lighting indicating lamp 37 and starting the clock motor 43, which moves the rotating contact hand 41 until it contacts the hand 38 and closes the circuit which operates the motor 24 and operates the mechanism 25 so the basket is raised up out of the grease to stop the contents from cooking further. As the basket reaches the top of its travel the projecting arm 35 on the slider 17 contacts a mercury switch 45 and opens the circuit and stops the motor 24. The mercury switch 45 is normally kept in closed circuit position by a spring 46 which pulls down on same. While the cooker is operating, a switch 47 is thrown on to start a motor 48 with its blower 49 situated in the chamber provided in the bottom of the housing 10. The blower 49 draws the fumes from the grease 30 through an inlet 50 connected to the upper portion of the tank 14 and expels them through an outlet duct 51 connected to an extraneous ventilator (not shown). Its switch is operated manually. The time switch mechanism is so arranged that it runs the motor 24 according to the setting. It will cook the articles in the grease for a certain period, then raise the basket so they may be removed allowing sufficient time for their removal and replacement with others, then connect the motor 24 again in the circuit to lower the basket, and repeat the process.

The device reduces the requirement for manual labor to a minimum, and at the same time keeps complete control of the temperature of the grease and the time for cooking the food. It is simple in construction and compact in form, yet affords a very effective arrangement.

While but one general form of the invention is shown in the drawings and described in the specifications, it is not desired to limit this application for patent to this particular form, as it is appreciated that other forms of construction could be made that would use the same principles and come within the scope of the appended claims.

Having thus described the invention, what is claimed is:

1. A cooking unit comprising a housing, a tank within said housing adapted to contain a cooking liquid, a motor located in said housing between the bottom thereof and the bottom of said tank, a basket within said tank for holding articles of food, connecting means between said motor and said basket including a cradle supporting said basket, said cradle having diametrically opposed U-shaped extensions adapted to straddle the side walls of said tank, a pair of sliders adapted to receive the free ends of said extensions, a pair of rails guiding the sliders, connecting rods between said sliders and said motor, and automatic control means to energize said motor for raising said basket out of the liquid in the tank.

2. A cooking unit comprising a housing, a tank within said housing containing a cooking liquid, a motor located in said housing between the bottom thereof and the bottom of said tank, a basket within said tank for holding articles of food, said basket being slidably mounted in said tank, a cover for said housing and tank, connecting means between said motor and said basket including a cradle supporting said basket, said cradle having diametrically opposed U-shaped extensions adapted to straddle the side walls of said tank, a pair of sliders adapted to receive the free ends of said extensions, a pair of rails guiding the sliders, connecting rods between said sliders and said motor, automatic control means to energize said motor for raising said basket out of the liquid in the tank whereby said housing cover is opened upon reaching a predetermined position during its upward movement to enable access to the articles of food in said basket.

CARROLL C. MARTIN.

REFERENCES CITED

The following references are of record in the file of this patent:

UNITED STATES PATENTS

| Number | Name | Date |
|---|---|---|
| 1,812,266 | Hummel et al. | June 30, 1931 |
| 1,887,848 | Peirce | Nov. 15, 1932 |
| 2,019,170 | Barlow | Oct. 29, 1935 |
| 2,050,303 | Forshee | Aug. 11, 1936 |
| 2,092,849 | Maier | Sept. 14, 1937 |
| 2,108,627 | Tyler | Feb. 15, 1938 |
| 2,175,531 | Kortum | Oct. 10, 1939 |
| 2,177,166 | Bemis | Oct. 24, 1939 |
| 2,215,929 | Husk | Sept. 24, 1940 |
| 2,244,168 | Miller | June 3, 1941 |
| 2,372,978 | Pelenberg | Apr. 3, 1945 |